United States Patent
Hitaka et al.

(10) Patent No.: US 8,190,935 B2
(45) Date of Patent: May 29, 2012

(54) INFORMATION PROCESSING APPARATUS AND METHOD OF CONTROLLING OPERATING FREQUENCY OF AN INFORMATION PROCESSING APPARATUS

(75) Inventors: Go Hitaka, Tokyo (JP); Masahiro Yamagishi, Saitama-ken (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 518 days.

(21) Appl. No.: 12/487,029

(22) Filed: Jun. 18, 2009

(65) Prior Publication Data

US 2010/0095142 A1    Apr. 15, 2010

(30) Foreign Application Priority Data

Oct. 14, 2008    (JP) ................................ P2008-265476

(51) Int. Cl.
G06F 1/00    (2006.01)
(52) U.S. Cl. ...................................................... 713/322
(58) Field of Classification Search .................. 713/322, 713/501; 710/25
See application file for complete search history.

(56) References Cited

U.S. PATENT DOCUMENTS

| | | | | |
|---|---|---|---|---|
| 5,652,895 A * | 7/1997 | Poisner .......................... | 713/322 |
| 5,781,783 A * | 7/1998 | Gunther et al. ............... | 713/320 |
| 6,000,035 A * | 12/1999 | Matsushima et al. ......... | 713/320 |
| 6,073,244 A * | 6/2000 | Iwazaki ........................ | 713/322 |
| 6,470,456 B1 * | 10/2002 | Chung-Chih .................. | 713/322 |
| 7,159,134 B2 * | 1/2007 | Soerensen et al. ............ | 713/322 |
| 7,231,534 B2 * | 6/2007 | Ma ................................ | 713/323 |
| 7,254,721 B1 * | 8/2007 | Tobias et al. .................. | 713/300 |
| 7,340,621 B2 * | 3/2008 | Lam .............................. | 713/300 |
| 7,346,787 B2 * | 3/2008 | Vaidya et al. ................. | 713/300 |
| 7,549,071 B2 * | 6/2009 | Watts et al. .................... | 713/322 |
| 7,925,901 B2 * | 4/2011 | Felter et al. ................... | 713/300 |

FOREIGN PATENT DOCUMENTS

JP    2002-099432 A    4/2002

* cited by examiner

*Primary Examiner* — Paul R Myers
(74) *Attorney, Agent, or Firm* — Maschoff Gilmore & Israelsen

(57) ABSTRACT

An information processing apparatus has a CPU, a clock supply unit configured to supply a clock signal, a CPU idle ratio obtaining unit configured to obtain the idle ratio of the CPU at each predetermined time, a clock control unit configured to determine an operating frequency of the clock signal, and a DMA transfer unit configured to execute a DMA transfer in synchronization with the clock signal supplied from the clock supply unit. The clock control unit controls the operating frequency of the clock signal to the operating frequency determined based on the idle ratio of the CPU if the DMA transfer is not being executed, whereas the clock control unit controls the operating frequency of the clock signal to a predetermined frequency if the DMA transfer is being executed.

20 Claims, 5 Drawing Sheets

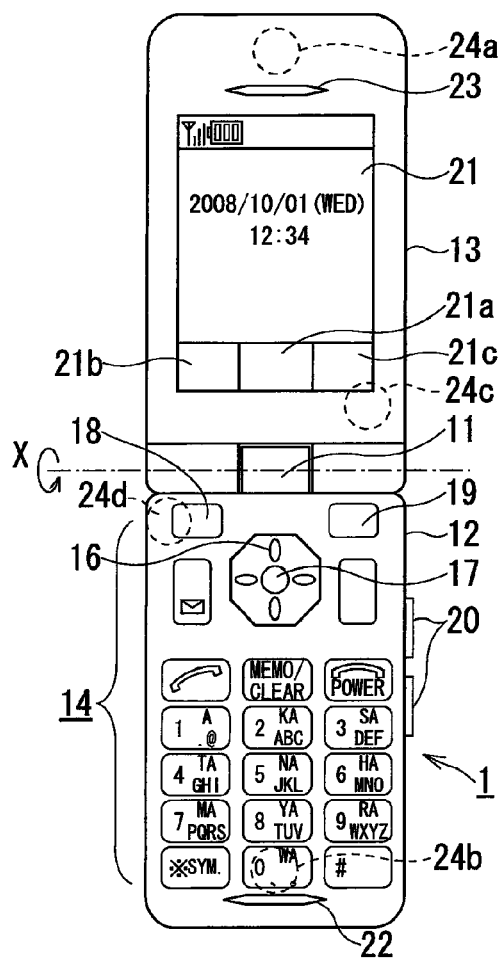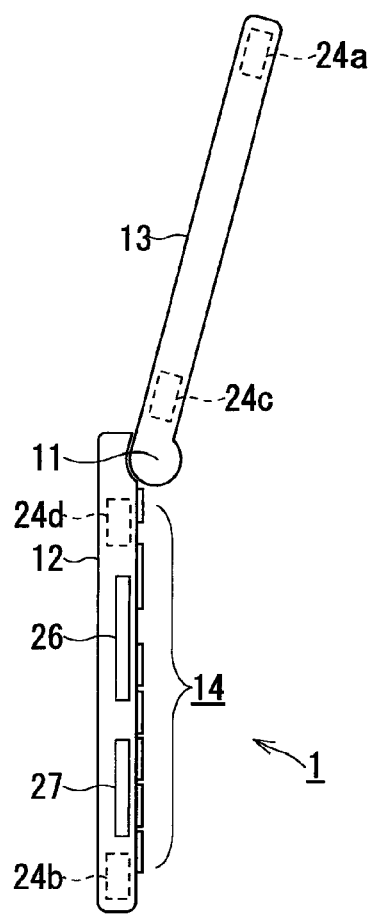
FIG. 1A  FIG. 1B
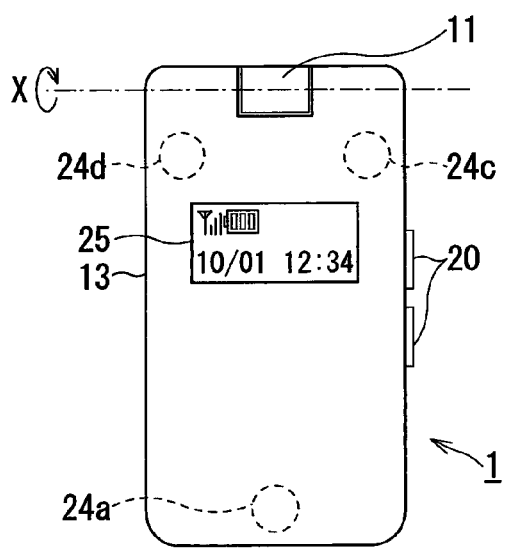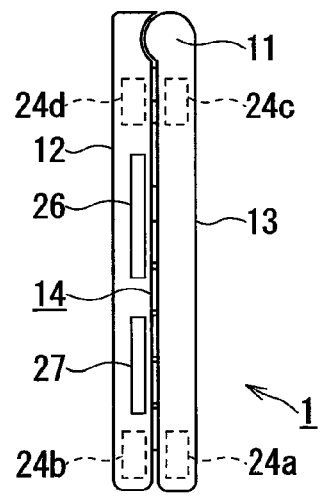
FIG. 2A  FIG. 2B

INFORMATION PROCESSING APPARATUS AND METHOD OF CONTROLLING OPERATING FREQUENCY OF AN INFORMATION PROCESSING APPARATUS

BACKGROUND OF THE INVENTION

1. Field of the Invention

The present invention relates to an information processing apparatus and method of controlling an operating frequency thereof, and more particularly to an information processing apparatus and method of controlling an operating frequency thereof for preferably executing a DMA transfer.

2. Related Art

Recently, information processing apparatuses, which are driven by a built-in battery and typically represented by mobile phones, are widely used outside the home and when a user is traveling. Further, the information processing apparatuses are provided with not only a voice communication function and an e-mail function but also with a reproduction function of moving image data, music data, and the like a one-segment broadcast looking/listening/recording function, and the like so that they have a sophisticated function.

As the function of the information processing apparatuses is made sophisticated, it is indispensable to enhance the performance of a processor by increasing an operating frequency. However, the power consumption of the information processing apparatuses is increased as the operating frequency is increased. Therefore, mobile equipments such as mobile phones and the like, in particular, have a problem in that they cannot be continuously used for a long time because the drive time of a built-in battery is made short.

To cope with the above problem, there is conventionally disclosed a technique capable of reducing the power consumption of an information processing apparatus by changing an operating frequency (refer to, for example, Japanese Unexamined Patent Application Publication No. 2002-99432). Further, there is also known a technique for obtaining the idle ratio of a CPU each predetermined time and changing an operating frequency according to the obtained idle ratio of the CPU.

An information processing apparatus is provided with a DMA (Direct Memory Access) controller for executing a DMA transfer for directly transferring data is between memories or between a memory and an external storage unit without passing through a CPU. In many information processing apparatuses manufactured recently, the speed of a DMA transfer executed by the DMA controller depends on a clock for determining the operating frequency of a CPU, and, in this case, the speed of the DMA transfer is naturally increased by an increase of the operating frequency of the CPU.

The CPU may be placed in an idle state here. In an information processing apparatus, in which a DMA transfer speed depends on a clock for determining the operating frequency of a CPU, when the CPU is placed in the idle state as described above, the operating frequency is reduced. Since the DMA transfer speed is reduced by the reduction of the operating frequency, a DMA transfer time is increased.

As described above, the conventional technique for controlling the operating frequency of a CPU does not sufficiently take a DMA transfer speed into consideration.

SUMMARY OF THE INVENTION

The present invention has been accomplished in view of the above circumstances, and an object of the present invention to provide an information processing apparatus capable of preferably reducing power consumption as well as keeping a processing performance of a DMA transfer process high by controlling an operating frequency.

This and other object can be achieved according to the present invention by providing an information processing apparatus of the present invention including: a CPU;
a clock supply unit configured to supply a clock signal;
a CPU idle ratio obtaining unit configured to obtain the idle ratio of the CPU at each predetermined time;
a clock control unit configured to determine an operating frequency of the clock signal; and
a DMA transfer unit configured to execute a DMA transfer in synchronization with the clock signal supplied from the clock supply unit,
wherein the clock control unit controls the operating frequency of the clock signal to the operating frequency determined based on the idle ratio of the CPU if the DMA transfer is not being executed, whereas the clock control unit controls the operating frequency of the clock signal to a predetermined frequency if the DMA transfer is being executed In order to the problems described above, according to another aspect of the present invention, there is provided an information processing apparatus including: a CPU;
a clock supply unit configured to supply a clock signal;
a CPU idle ratio obtaining unit configured to obtain the idle ratio of the CPU at each predetermined time;
a clock control unit configured to determine an operating frequency of the clock signal; and
a DMA transfer unit configured to execute a DMA transfer in synchronization with the clock signal supplied from the clock supply unit,
wherein the clock control unit controls the operating frequency of the clock signal to the operating frequency determined based on the idle ratio of the CPU if the DMA transfer is not being executed, whereas the clock control unit controls the operating frequency of the clock signal to a predetermined frequency or higher regardless of the idle ratio of the CPU if the DMA transfer is started.

In order to solve the above-mentioned problem, according to another aspect of the present invention, there is provided a method of controlling an operating frequency of a information processing apparatus including the steps of:
preparing the information processing apparatus configured to execute a DMA transfer in synchronization with an clock signal;
obtaining the idle ratio of a CPU at each predetermined time;
determining the operating frequency of the clock signal based on the idle ratio of the CPU;
determining whether or not that the DMA transfer is being executed; and
controlling the operating frequency of the clock signal to the operating frequency determined based on the idle ratio of the CPU if the DMA transfer is not being executed, whereas controlling the operating frequency of the clock signal to a predetermined frequency if the DMA transfer is being executed.

The information processing apparatus according to the present invention can preferably reduce power consumption as well as can keep a processing performance of the DMA transfer process high by controlling the operating frequency.

BRIEF DESCRIPTION OF THE DRAWINGS

FIGS. 1A and 1B are diagrams showing external arrangements of a mobile phone showing an embodiment of an information processing apparatus according to the present invention;

FIGS. 2A and 2B are diagrams showing other external arrangements of the mobile phone showing the embodiment of the information processing apparatus according to the present invention;

FIGS. 6A and 6B are graphs showing transition examples of a clock level controlled by the clock level controller, wherein FIG. 6A is a graph showing a transition example of the clock level in the embodiment, and FIG. 6B is a graph showing a comparative example of a transition example of the clock level.

DESCRIPTION OF THE PREFERRED EMBODIMENT

Figure 3:
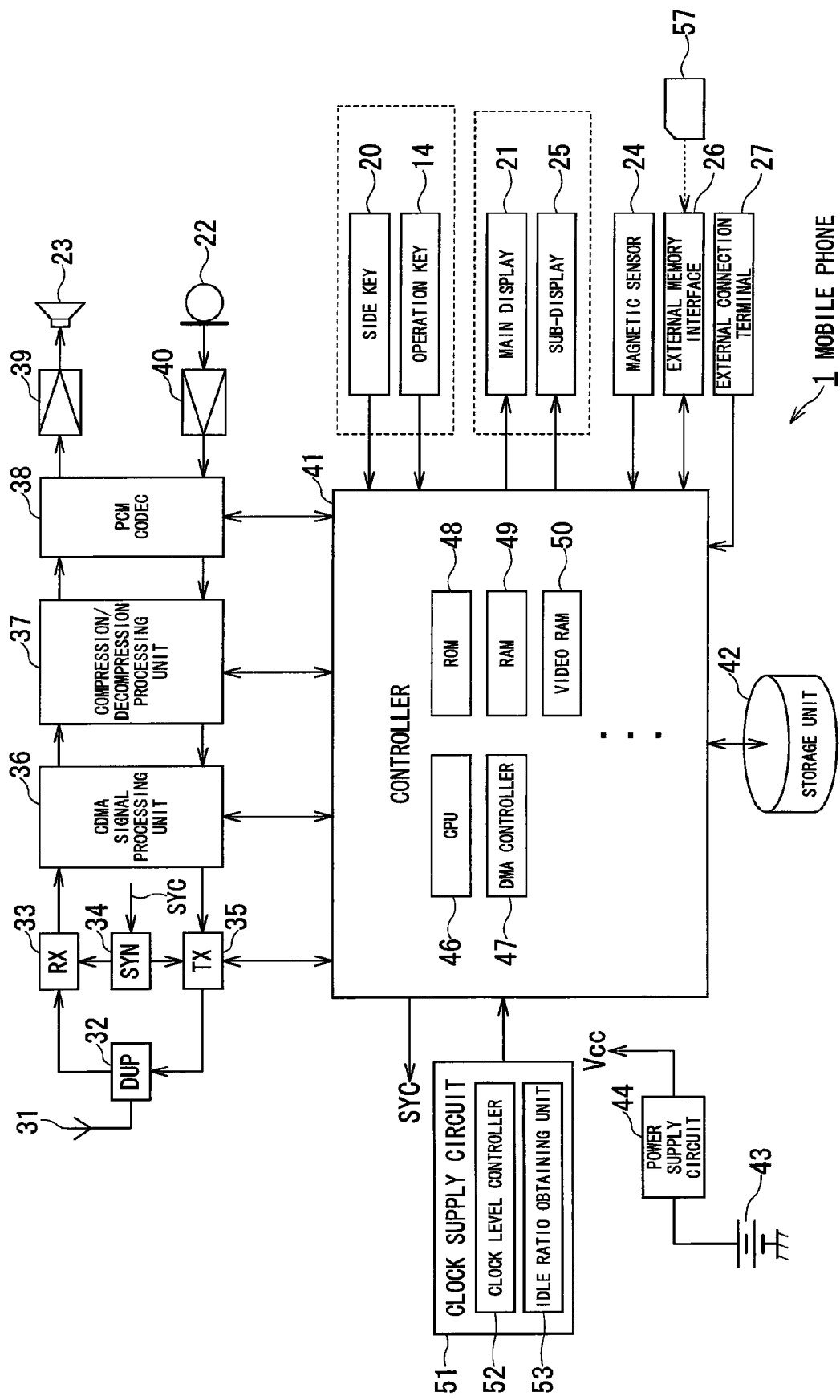
FIG. 3 is a diagram showing an internal arrangement of the mobile phone of the embodiment.

An embodiment of an information processing apparatus according to the present invention will be explained based on the accompanying drawings. FIGS. 1A and 1B are diagrams showing external arrangements of a mobile phone showing the embodiment of the information processing apparatus according to the present invention. FIG. 1A shows an external arrangement of the mobile phone 1 viewed from a front surface when it is opened about 180°, and FIG. 1B shows an external arrangement of the mobile phone 1 in the open state when it is viewed from a left side surface.

As shown in the FIGS. 1A and 1B, the mobile phone 1 is formed such that a first body 12 is hinge-coupled with a second body 13 across a central hinge portion 11 as a boundary so that they can be folded in an X-direction through the hinge portion 11. A transmission/reception antenna is built in the mobile phone 1 at a predetermined position so that mobile phone 1 transmits and receives a radio wave to and from a base station (not shown) through the built-in antenna.

The first body 12 has operation keys 14 such as "0" to "9" numerical keys, a call/response key, a redial key, a call end/power supply key, a clear key, a menu key, and the like disposed on the front surface thereof, and it is possible to input various instructions using the operation keys 14.

The first body 12 has a cross key 16 and a decision key 17 disposed to an upper portion thereof as the operation keys 14. The cross key 16 has an upper direction key, a lower direction key, a right direction key, and a left direction key, and a user can move a cursor and the like displayed on a main display 21 in up, down, right, and left directions by operating the cross key 16 in the up, down, right, and left directions. Further, various functions can be decided by depressing the decision key 17. A process displayed on a decision key function display unit 21a, which is disposed to a lower portion of the main display 21, is also allocated to the decision key 17.

Further, the first body 12 has a left soft key 18 and a right soft key 19 disposed to upper portions of the cross key 16 and the decision key 17, respectively. A side key 20 is disposed on a side surface of the first body 12 to operate the mobile phone 1. When the left soft key 18, the right soft key 19, and the side key 20 are depressed inward of the first body 12, they are allocated with predetermined processes, respectively. In particular, the processes, which are displayed on a left soft key function display portion 21b and a right soft key function display portion 21c disposed to a lower portion of the main display 21 are allocated to the left soft key 18 and the right soft key 19.

The first body 12 has a microphone 22 disposed to a lower portion of the operation key 14, and the microphone 22 gathers a voice of a user in a phone call.

Note that the first body 12 has a not shown battery pack attached on a back surface side thereof. When the call end/power supply key is depressed, respective circuits are supplied with power from the battery pack and the mobile phone 1 starts up so that it can be operated.

In contrast, the main display 21 is disposed on a front surface of the second body 13 and can display e-mail contents, a home page, and the like in addition to a radio wave reception state and a battery remaining amount. Note that the main display 21 is a display composed of, for example, a LCD (Liquid crystal Display), an organic EL (Electro Luminescence) display, and an inorganic EL display.

Further, a receiver 23 is disposed at a predetermined position of an upper portion of the main display 21, and the user can execute a voice communication therethrough. Note that a speaker (not shown) is also disposed at a predetermined position of the mobile phone 1. In a TV phone communication, the voice of a call opponent is output from the speaker.

The mobile phone 1 has magnetic sensors 24a, 24b, 24c, and 24d (magnetic sensor 24) disposed at predetermined positions in the first and second bodies 12 and 13 to detect the states of the bodies 12, 13 of the mobile phone 1.

FIGS. 2A and 2B are diagrams showing other external arrangements of the mobile phone showing the embodiment of the information processing apparatus according to the present invention. The mobile phone 1 of FIGS. 2A and 2B are turned in the direction of an arrow X from the state of the mobile phone 1 of FIGS. 1A and 1B so that it is closed. FIG. 2A shows an external arrangement of the mobile phone 1 when viewed from a front surface when it is closed, and FIG. 2B shows an external arrangement of the mobile phone 1 when viewed from a left side surface when it is closed.

A sub-display 25 composed of, for example, a LCD is disposed to the second body 13 and shows an antenna PICT, which indicates a present sensitivity level of the antenna, a battery PICT, which indicates a present battery remaining amount of the mobile phone 1, a present time, and the like.

Further, an external memory interface 26 and an external connection terminal 27 are disposed to a left side surface of the first body 12. The external memory interface 26 has a slot to and from which a memory card (not shown) can be mounted and dismounted. The memory card is a kind of a flash memory card represented by a NAND flash memory card, a NOR flash memory card, and the like, and various types of data such as an image, audio, music, and the like can be written and read to and from it through a 10-pin terminal. The external connection terminal 27 is a terminal which is connected to a charging cable used when the battery is charged and to a USB cable and the like used when the mobile phone 1 is connected to various types of external equipments such as a personal computer and the like.

FIG. 3 is a diagram showing an internal arrangement of the mobile phone 1 of the embodiment. A radio signal transmitted from the base station is received by the antenna 31, passes through an antenna diplexer (DUP) 32 passes, and it input to a receiver (RX) 33. The receiver 33 may perform mixing of the received radio signal with a local oscillation signal output from a frequency synthesizer (SYN) 34 to down-convert the received radio signal into an intermediate frequency signal. Then, the receiver 33 generates a reception baseband signal by performing a quadrature (quadrature direction) on the down-converted intermediate frequency signal.

The reception baseband signal generated by the receiver 33 is input to a CDMA signal processing unit 36. The CDMA signal processing unit 36 is provided with a RAKE receiver (not shown). In the RAKE receiver, a plurality of paths included in the reception baseband signal are de-spread with respective spread codes (i.e., spread codes equivalent to those of spread reception signals). Then, after the phase in the despread signals of the respective paths in adjusted, the despread signals of the respective paths are coherent Rake combined by the RAKE receiver. A data train obtained through the RAKE combining is subjected to de-interleaving, channel decoding (error correction decoding), and binary data determination. With this operation, reception packet data having a predetermined transfer format can be obtained. The reception packet data is input to a compression/decompression processing unit 37.

The compression/decompression processing unit 37 is composed of a DSP (Digital Signal Processor). The compression/decompression processing unit 37 separates the reception packet data output from the CDMA signal processing unit 36 to respective media by a multiplexer/demultiplexer (not shown), and subjects the reception packet data of the separated media to a decoding process.

A digital video signal obtained through decoding performed by a video codec of the compression/decompression processing unit 37 is input to a controller 41. The controller 41 causes the main display 21 to display a video image based on the digital video signal output from the compression/decompression processing unit 37 through a not shown video RAM (for example, VRAM and the like).

The compression/decompression processing unit 37 compression-codes the digital video signal from the controller 41 so as to generate video data. After the compression/decompression processing unit 37 causes the multiplexer/demultiplexer to multiplex the video data into transfer packet data according to the predetermined transfer format, it packetizes them, and outputs transmission packet data after it is packetized to the CDMA signal processing unit 36.

The CDMA signal processing unit 36 uses a spread code assigned to a transmission channel to perform spread spectrum processing on the transmission packet data output from the compression/decompression processing unit 37, and outputs an output signal generated by the spread spectrum processing to a transmitter (TX) 35. The transmitter 35 modulates the signal after the spread spectrum processing by using a digital modulation method such as a QPSK (Quadrature Phase Shift Keying) method. The transmitter 35 synthesizes the transmission signal after the digital modulation with the local oscillation signal generated from the frequency synthesizer 34 to up-convert the transmission signal into the radio signal. Then, the transmitter 35 high-frequency-amplifies the radio signal generated by the up-conversion so as to obtain the transmission power level indicated by the controller 41. The high-frequency-amplified radio signal is supplied to the antenna 31 through the antenna diplexer 32 and transmitted to the base station from the antenna 31.

A power supply circuit 44 generates a predetermined operation power supply voltage Vcc based on an output from the battery 43 and supplies it to the respective circuits.

A clock supply circuit 51 generates a clock signal having a predetermined operating frequency and supplies the clock signal to the respective units of the mobile phone 1. A CPU idle ratio obtaining unit 53 obtains the idle ratio of a CPU 46 and supplies the idle ratio of the CPU 46 to a clock level controller 52. The CPU idle ratio obtaining unit 53 can obtain the idle ratio by, for example, the ratio of a sleep task occupying the CPU 46 per a predetermined time. The clock level control unit 52 determines the frequency level (clock level) of the clock signal supplied to the respective units from the clock supply circuit 51 according to the obtained idle ratio of the CPU 46 and controls the clock supply circuit 51. The clock level is controlled stepwise between a plurality of levels (for example, 1 to 4 levels) to which the predetermined operating frequency is allocated.

The embodiment will be explained assuming that when the clock level is high, the operating frequency is high, whereas when the clock level is low, the operating frequency is low. Note that, although the CPU 46 is operated based on an internal clock of the CPU 46, the internal clock of the CPU 46 has a dependence relation proportional to the operating frequency of the clock signal (external clock) supplied from the clock supply circuit 51.

The controller 41 is mainly composed of the CPU (Central Processing Unit) 46, a ROM (Read Only Memory) 48, a RAM (Random Access Memory) 49, a DMA (Direct Memory Access) controller 47. The CPU 46 executes various types of processes according to a program stored to the ROM 48 or to various types of application programs loaded from a storage unit 42 to the RAM 49. Further, the CPU 46 integrally controls the mobile phone 1 by generating various control signals and supplying them to the respective units.

The RAM 49 is a DRAM, an SDRAM, and the like acting as a main memory and appropriately stores data which are necessary for the CPU 46 to execute the various processes. Further, the controller 41 also has a video RAM 50. Information as to a video picture displayed on the main display 21 is temporarily stored to video RAM 50.

The DMA controller 47 solely controls a DMA (Direct Memory Access) transfer for directly transferring data between memories or between a memory and an external storage unit without passing through the CPU 46. The DMA controller 47 executes the DMA transfer between memories such as SDRAMs and the like, between the storage unit 42 and a memory, and between a memory card 57 connected to the external memory interface 26 and the external storage unit connected to the external connection terminal 27 and a memory.

The storage unit 42 is composed of, for example, a flash memory device, a HDD (Hard Disc Drive), and the like, which are a non-volatile memory that can be electrically rewritten and deleted. The storage unit 42 stores various application programs executed by the CPU 46 and various data groups.

The mobile phone 1 of the embodiment is arranged such that the operating frequency (external clock) of the clock signal supplied from the clock supply circuit 51 to the respective units of the mobile phone 1 can be controlled between the plurality of clock levels. The clock level is determined according to the idle ratio of the CPU 46 obtained by the CPU idle ratio obtaining unit 53 of the clock supply circuit 51.

Figure 4:
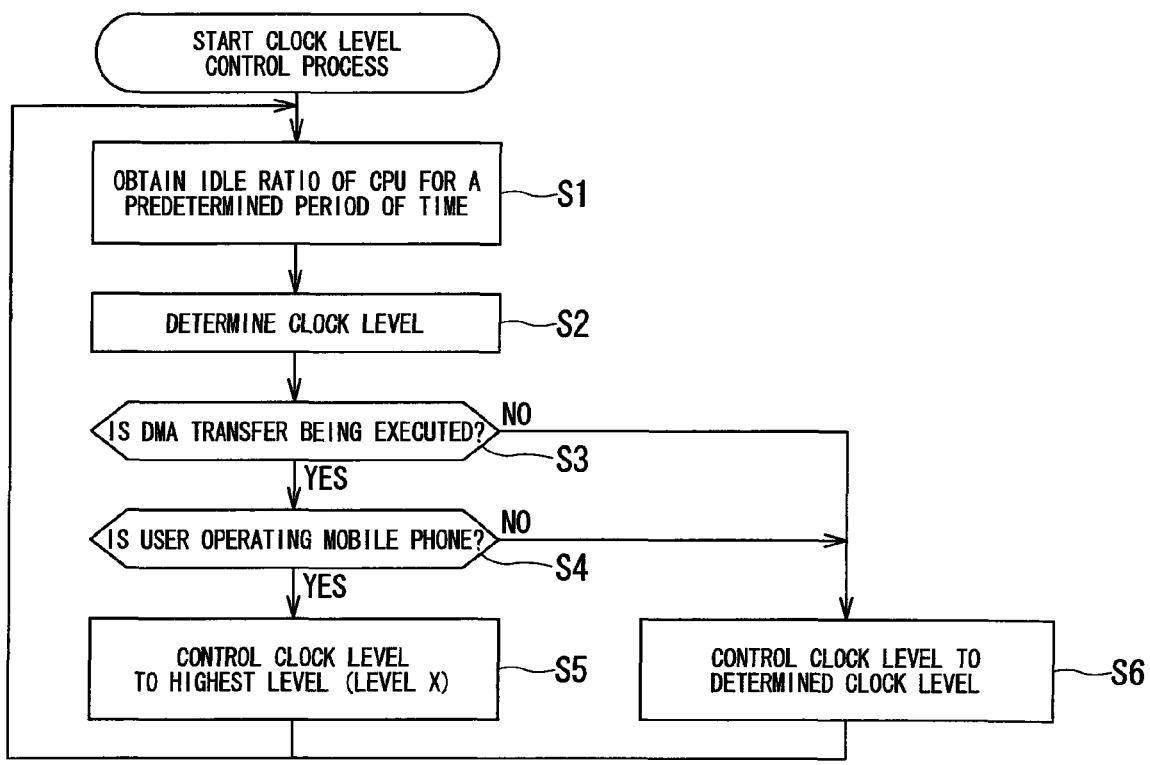
FIG. 4 is a flowchart explaining a clock level control process executed by a clock level controller of the mobile phone of the embodiment.

A clock level control process executed by the mobile phone 1 of the embodiment will be explained. The clock level control process has an ordinary clock level control process and a clock level control process when the DMA transfer is started and finished. These clock level control process are asynchronously executed. The ordinary clock level control process is executed at each predetermined time (for example, at each 50 ms) when the mobile phone 1 is started up. The clock level control process when the DMA transfer is started and finished is executed at all times. FIG. 4 is a flowchart explaining the ordinary clock level control process executed by the clock level controller 52 of the mobile phone 1 of the embodiment.

At step S1, the clock level controller 52 of the clock supply circuit 51 obtains the idle ratio of the CPU 46 for a predetermined period of time (for example, 50 msec to 100 msec) calculated by the idle ratio obtaining unit 53 of the CPU. The clock level controller 52 may store the obtained idle ratio of the CPU 46 so that it can be referred to in the clock level control process of FIG. 5 to be described later. The CPU idle ratio obtaining unit 53 determines the idle ratio of the CPU 46 by the ratio of the sleep task at which it occupies the CPU 46 for the predetermined time.

Here, tasks executed by the CPU 46 are provided with a priority, respectively. The sleep task is a special task provided with a lowest priority in these tasks and waits for execution at all times. In the state that the sleep task occupies the CPU 46, since any other task is not being executed in the CPU 46 or is not in an execution waiting state, it is shown that the CPU 46 is in an idle state.

At step S2, the clock level controller 52 determines a clock level according to the idle ratio of the CPU 46 obtained from the CPU idle ratio obtaining unit 53. The clock level controller 52 may store the determined clock level so that it can be referred to in a clock level control of FIG. 5 to be described later. When the idle ratio of the CPU 46 is smaller than a predetermined threshold value A, the clock level controller 52 increases the present clock level to a level higher than it by one step. Further, when the idle ratio of the CPU 46 is larger than the predetermined threshold value B, the clock level controller 52 decreases the present clock level to a level lower than it by one step.

When the idle ratio of the CPU 46 is smaller than the threshold value A, since the ratio at which the CPU 46 is occupied by a task other than the sleep task is high, it is necessary to improve a task processing capability by operating the CPU 46 by a high operating frequency. In contrast, when the idle ratio of the CPU 46 is larger than the threshold value B, since the ratio at which the CPU 46 is occupied by the sleep task is high, it is possible to save power by operating the CPU 46 by a low operating frequency.

The threshold values A and B may be the same value or a different value. However, to preferably realize the power saving of the mobile phone 1, the threshold values A and B are preferably determined so that a clock level is unlike to be increased even if the idle ratio is increased a little and the change of the clock level, which is caused by the decrease of a rate of use, has a following capability.

At step S3, the clock level controller 52 determines whether or not the DMA transfer is executed by the DMA controller 47.

When the clock level controller 52 determines that the DMA transfer is being executed, it determines whether or not the user is operating the mobile phone 1 at step S4. The clock level controller 52 determines whether or not the user is operating the mobile phone 1 based on, for example, whether or not the main display 21 is being lit, whether or not a time passed after an input is accepted by the operation keys 14 is within a predetermined time, whether or not the DMA transfer is executed based on the operation for accepting the input by the operation keys 14, or whether or not the first and second bodies 12 and 13 of the mobile phone 1 are placed in the open state. When the main display 21 is being lit, when the DMA transfer is executed based on the operation for accepting the input by the operation keys 14, or when the first and second bodies 12 and 13 of the mobile phone 1 are placed in the open state, the clock level controller 52 determines that the user is operating the mobile phone 1. The clock level controller 52 can make the determination by selecting one or a plurality of determination methods from these determination methods. Note that the process may go to step S5 without determining whether or not the user is executing the operation at all at step S4 (that is, the process may go to step S5 when the DMA transfer is being executed without determining whether or not the user is executing the operation). The determination whether or not the user is executing the operation, which will be explained below (steps S12, S15, and S18 of FIG. 5), can be also omitted likewise.

When the clock level controller 52 determines that the user is operating the mobile phone 1, it controls the clock level to a highest level at step S5 (or when the clock level is already controlled to the highest level, it keeps the level regardless of the level obtained at S2.). Since the clock level controller 52 can increase the DMA transfer speed by controlling the clock level to the highest level regardless of the clock level obtained at the level processing step S2, it can execute the DAM transfer in a sophisticated performance.

In contrast, when the clock level controller 52 determines that the DMA transfer is not being executed at the DMA transfer determination step S3 and when the clock level controller 52 determines that the user is not operating the mobile phone 1 at the operation determination step S4, at step S6, it controls the clock level to the level determined at the determination step S2.

After the clock level is controlled by the clock level controller 52 at the level control steps S5 and S6, the process returns to the idle ratio obtaining step S1 at which the idle ratio of the CPU 46 is obtained at each predetermined time. The explanation of the clock level control process is finished by the above description.

Note that the level, to which the previous level is increased at the level control step S5, is not limited to the highest level and may be increased to a predetermined high level (when, for example, four levels are employed, the present level may be increased to a highest level or a second highest level (hereinafter, called a level X). When, for example, the present level is controlled at the level control step S5 so that it is increased to the level X, if the clock level is less than the level X at the level control step S5, the present clock level is controlled so that it is set to the level X regardless of the clock level obtained at the level determination step S2. Further, when the clock level already exceeds the level X, it is kept to the level X or higher regardless of the level obtained at the level determination step S2. When the clock level at the beginning of execution of the DMA transfer is the highest level, the clock level is controlled based on the clock level determined at the level determination step S2 until it is set to the level X. More specifically, the clock level is controlled according to the idle ratio of the CPU 46 until it is decreased from the highest level to the level X.

Figure 5:
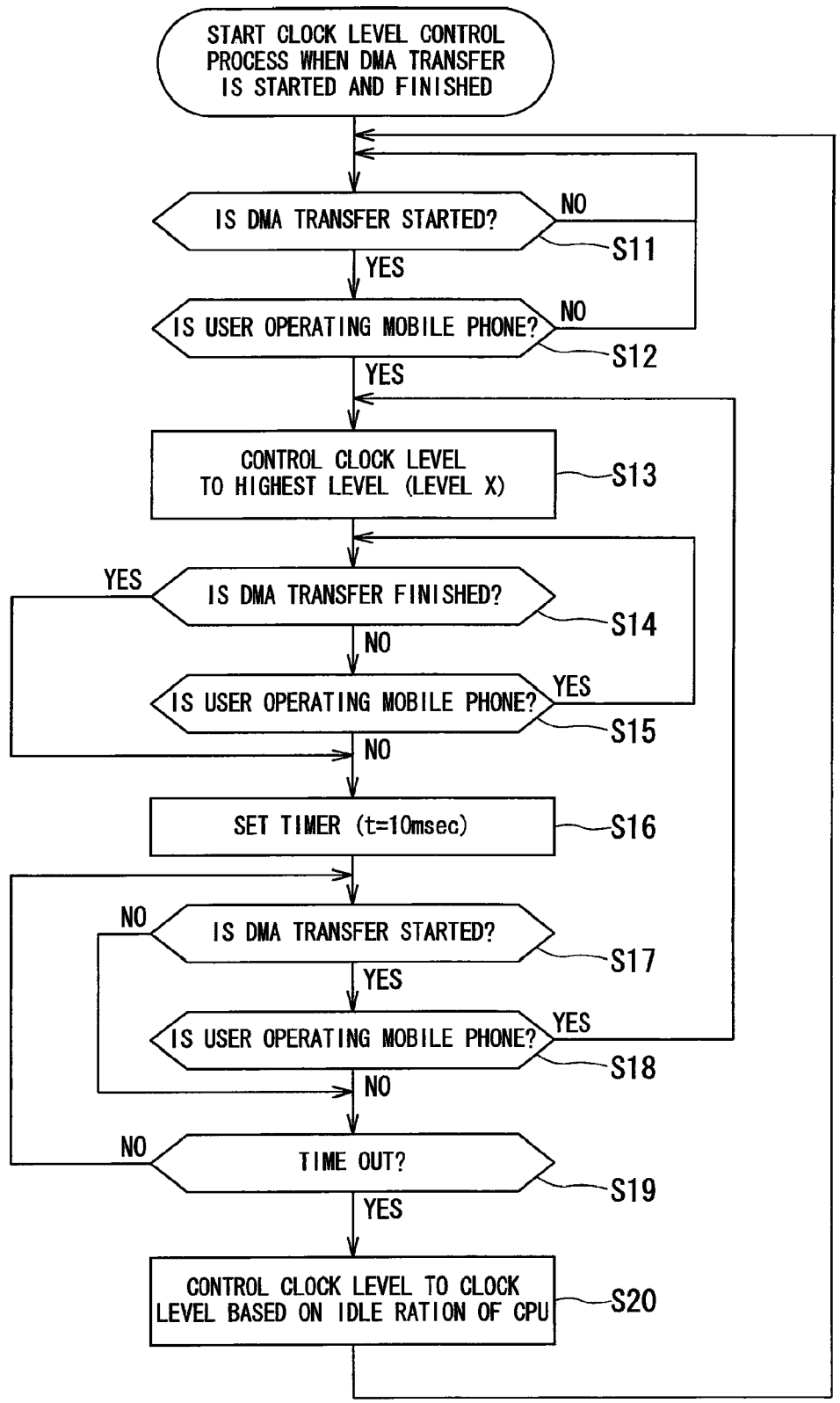
FIG. 5 is a flowchart explaining a clock level control process executed by the clock level controller of the mobile phone of the embodiment when a DMA transfer is started and when it is finished.

Next, the clock level control process when the DMA transfer is started and finished will be explained. FIG. 5 is a flowchart explaining the clock level control process executed by the clock level controller 52 of the mobile phone 1 of the embodiment when the DMA transfer is started and finished.

At step S11, the clock level controller 52 determines whether or not the DMA transfer is started by the DMA controller 47. When the clock level controller 52 determines that the DMA transfer is not started, it waits for a process until the DMA transfer is started.

In contrast, when the clock level controller 52 determines that the DMA transfer is started, it determines whether or not the user is operating the mobile phone 1 at step S12. When the clock level controller 52 determines that the user is not operating the mobile phone 1, the process returns to the DMA transfer start determination step S11.

When the clock level controller 52 determines that the user is operating the mobile phone 1, it controls the clock level to the highest level (or when it is already set to the highest level, the clock level controller 52 keeps the highest level) at step S13. The clock level controlled at the time is not limited to the highest level and may be controlled so that it is increased to the level X described above (or when it is already set to the level X or higher, the level is kept.).

The clock level controller 52 determines whether or not the DMA transfer is finished at step S14. When the clock level controller 52 determines that the DMA transfer is finished, the process goes to a timer set step S16. In contrast, when the clock level controller 52 determines that the DMA transfer is not finished, it determines whether or not the user is operating the mobile phone 1 at step S15. When the clock level controller 52 determines that the user is operating the mobile phone 1, the process returns to a DMA transfer finish determination step S14. This is because it is necessary to continuously keep the clock level to the highest level (or to the level X or higher) when the DMA transfer is being executed as well as the user is operating the mobile phone 1. In contrast, when the user is not operating the mobile phone 1 even if the DMA transfer is being executed, a process similar to that executed when the DMA transfer is finished is executed because it is not necessary to keep a high operability to the user.

When the clock level controller 52 determines that the DMA transfer is finished at the DMA transfer finish determination step S14 or determines that the user is not operating the mobile phone 1 at the user operation determination step S15 although the DMA transfer is not finished, it sets a timer for counting a predetermined time (for example, 10 msec) at step S16. The DMA transfer has a very high probability that it is executed again after it is finished once. When it is finished to keep the high clock level just after the completion of the DMA transfer or just after the completion of the operation of the user and the clock level is controlled to the clock level based on the idle ratio of the CPU 46, there is a possibility that a DMA transfer process is executed rather slowly because the clock level is frequently changed when the DMA transfer is executed again. Therefore, in the mobile phone 1 of the embodiment, the high clock is kept at a predetermined time such as after the completion of the DMA transfer and the like to make a preparation for the DMA transfer which has the high probability that it is executed again. The timer set by the clock level controller 52 is set to the predetermined time of, for example, 10 msec to 50 msec (time shorter than the intervals of the clock level control process of FIG. 4) and preferably to 10 msec.

The clock level controller 52 determines whether or not the DMA transfer is started at step S17. When the clock level controller 52 determines that the DMA transfer is not started, the process goes to a time out determination step S19.

In contrast, when the clock level controller 52 determines that the DMA transfer is started, it determines whether or not the user is operating the mobile phone 1 at step S18. When the clock level controller 52 determines that the user is operating the mobile phone 1, the process returns to the clock level control step S13.

When the clock level controller 52 determines that the DMA transfer is not started at the DMA transfer determination step S17 or when it determines that the user is not operating the mobile phone 1 at step S18 although the DMA transfer is started, it determines whether or not the timer set at step S16 is time out at step S19. When the clock level controller 52 determines that the predetermined time does not pass yet and the timer is not time out, the process returns to the DMA transfer start determination step S17.

When the clock level controller 52 determines that the timer set at the timer set step S16 is time out, it controls the clock level to the clock level based on the idle ratio of the CPU 46 at step S20. A clock level employed at step S20 is the clock level which is determined at the level determination step S2 of the clock level control process of FIG. 4 and which is stored so that it can be referred to. Thereafter, the process returns to step S11, and when the DMA transfer is started again, the processes at step S11 and subsequent steps are repeated.

Note that the clock level controller 52 controls the clock level to the clock level based on the idle ratio of the CPU 46 previously determined and stored at the clock level control step S20. However, the clock level controller 52 may determine the clock level based on a just before idle ratio which is obtained at the idle ratio obtaining step S1 of FIG. 4 and stored so that it can be referred to and control the clock level. Further, the clock level controller 52 may newly obtain the idle ratio of the CPU 46 after it determines that the timer is time out at time out determination step S19 and may control the clock level to the clock level determined based on the idle ratio.

Next, the clock level control processes of FIGS. 4 and 5 will be explained using a transition example of the clock level.

Figure 6A:
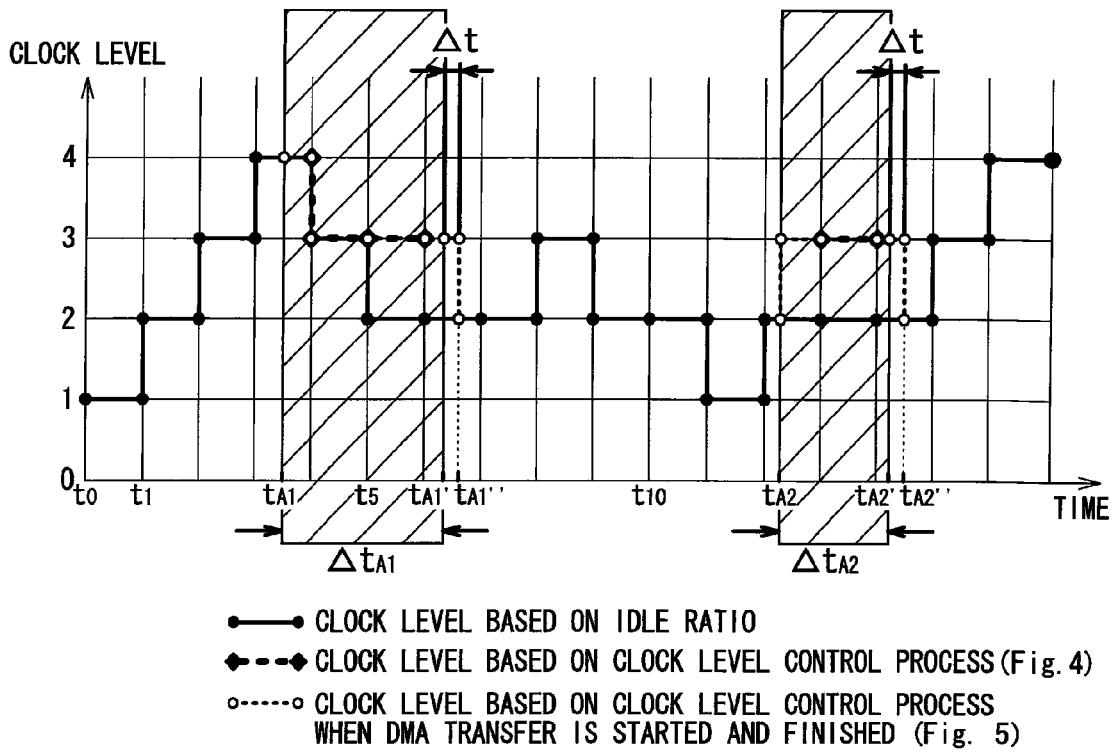
Figure 6B:
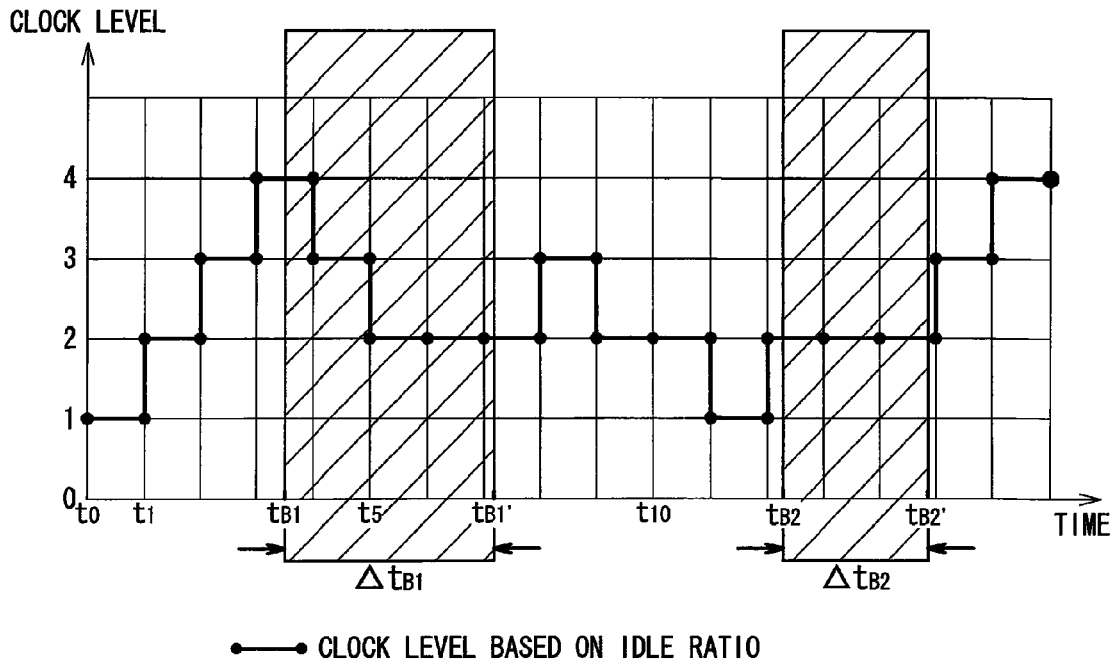

FIGS. 6A and B are graphs showing the transition example of the clock level controlled by the clock level controller 52. FIG. 6A is the graph showing the transition example of the clock level of the embodiment, and FIG. 6B is the graph showing a comparative example of the transition example of the clock level. A vertical axis of FIGS. 6A and 6B shows a clock level, and a horizontal axis thereof shows a time. It is assumed that the number of the clock level is four levels, and the level X as the clock level controlled (increased) by the clock level control step S5 of FIG. 4 and the clock level control step S13 of FIG. 5 is a level 3. Further, explanation will be made assuming that a predetermined time, during which the CPU idle ratio obtaining unit 53 obtains the idle ratio at the idle ratio obtaining step S1 of the clock level control process of FIG. 4, is 50 msec and that the clock level is determined and controlled (updated) at each 50 msec.

The clock level control process of FIG. 4 was executed at times $t_1$, $t_2$, and $t_3$ of FIGS. 6A and 6B, the clock level was increased one step by one step. The clock level was set to a level 4 at the time $t_3$. In more detail, since the idle ratio of the CPU 46 obtained by the CPU idle ratio obtaining unit 53 at the idle ratio obtaining step S1 was smaller than the threshold value A, the clock level controller 52 determined to increase the present clock level to the clock level which was higher than the present clock level by one step at the level determination step S2. Further, since the clock level controller 52 determined at the transfer execution determination step S3 that the DMA transfer was not executed, it executed a control for increasing the present clock level one step by one step.

The DMA transfer was started at a time $t_{A1}$ that is just after the time $t_3$ of FIG. 6A. With this operation, the clock level control of FIG. 5 was executed. Since the present clock level was the level 4 which was higher than the level 3 as the level X, the clock level controller 52 kept the present clock level without particularly increasing it (step S13). Note that it is assumed in the transition example of the clock level of FIG. 6A that the user is operating the mobile phone 1.

At a time $t_4$ of FIG. 6A, the clock level controller 52 executed the clock level control of FIG. 4. Since the idle ratio of the CPU 46 obtained by the CPU idle ratio obtaining unit 53 at the idle ratio obtaining step S1 was larger than the threshold value B, the clock level controller 52 determined to decrease the present clock level to the clock level which is lower than it by one step at the level determination step S2. Even when the DMA transfer was being executed, when the present clock level was the level 4 which was higher than the clock level (level 3) which was kept when the DMA transfer was being executed, the clock level controller 52 controlled the clock level based on the clock level determined at the level determination step S2 until the clock level was decreased to the level 3. More specifically, the clock level controller 52 controlled the clock level according to the idle ratio of the CPU 46 until the clock level was decreased from the level 4 to the level 3 (executes "a control for keeping the clock level at step S5 equal to or higher than the level X").

At times $t_5$, $t_6$ of FIG. 6A, the clock level controller 52 executed the clock level controls of FIGS. 4 and 5 and determined to set the clock level to a level 2 by the clock level control of FIG. 4 based on the idle ratio of the CPU 46 (step S2). However, since the DMA transfer was being executed, the clock level was kept to the level 3 regardless the idle ratio of the CPU 46 (step S5 of FIG. 4, and steps S14, S15 of FIG. 5). Since the clock level was kept to the level 3 by the clock level controller 52 at times $t_5$, $t_6$, the DMA transfer could be executed with a high processing performance. At the time, the clock level controller 52 stored the clock level based on the latest idle ratio of the CPU 46 determined at the level determination step S2 of FIG. 4 even when the DMA transfer was being executed. When the DMA transfer was finished, the clock level controller 52 controlled the level based on the stored clock level.

The DMA transfer was finished at a time $t_{41}{}'$ of FIG. 6A. The clock controller 52 executed a count of a predetermined time $\Delta t$ (for example, 10 msec) in the clock level control of FIG. 5 while keeping the clock level to the level 3 (step S16). Since the clock controller 52 determined that the DMA transfer was not started within a predetermined time $\Delta t$ or that the user was not operating the mobile phone 1 although the DMA transfer was started, it controlled the clock level to the level 2 which was the latest clock level determined and stored at the level determination step S2 of the clock level control process of FIG. 4 at a time $t_{41}{}''$ (step S20).

At times $t_7$ to $t_{12}$ of FIG. 6A, the clock controller 52 executed the clock level control process based on the clock level control process of FIG. 4 (detail is omitted). Thereafter, the DMA transfer was started at a time $t_{42}$. At the time, since the clock level was set to the level 2 smaller than the level 3 by the clock level control process of FIG. 5, the clock level controller 52 increased the clock level to the level 3 (step S13).

At times $t_{13}$, $t_{14}$ of FIG. 6A, the clock level controller 52 executed the clock level controls of FIGS. 4 and 5 and determined to set the clock level to the level 2 by the clock level control of FIG. 4 based on the idle ratio of the CPU 46 (step S2). However, since the DMA transfer was being executed, the clock level was kept to the level 3 regardless the idle ratio of the CPU 46 (steps S5 of FIG. 4, and steps S14, S15 of FIG. 5). The DMA transfer was finished at a time $t_{42}{}'$. The clock controller 52 executed a count of a predetermined time $\Delta t$ (for example, 10 msec) by the clock level control of FIG. 5 while keeping the clock level to the level 3 (step S16). Since the clock controller 52 determined that the DMA transfer was not started within the predetermined time $\Delta t$ or that the user was not operating the mobile phone 1 although the DMA transfer was started, it controlled the clock level to the level 2 which was the latest clock level determined and stored at the level determination step S2 of the clock level control process of FIG. 4 at a time $t_{42}{}''$ (step S20).

In contrast, at a time $t_{B1}$ of FIG. 6B as the comparative example, the clock level, which was determined based on the idle ratio of the CPU 46, was kept regardless of the start of execution of the DMA transfer. Further, since the DMA transfer was started at the time $t_{B1}$, the idle ratio of the CPU 46 was increased. Therefore, since the idle ratio was made larger than the threshold value B at the times $t_4$, $t_5$, the clock level was decreased one step by one step and finally transited to the level 2.

In the comparative example of FIG. 6B, since the clock level is decreased following to the increase of the idle ratio of the CPU 46, a power consumption is suppressed. However, since the DMA transfer speed is decreased by the decrease of the clock level, the processing performance of the DMA transfer is also decreased.

Therefore, since the DMA transfer takes $\Delta t_{B1}$, a time longer than the DMA transfer time $\Delta t_{41}$ of FIG. 6A is required as well as the power consumption is increased because a process is executed for a long time.

The DMA transfer speed of the DMA transfer which is started at the time $t_{42}$ can be also increased likewise regardless of the idle ratio of the CPU 46 by increasing the clock level to the level 3 in FIG. 6A showing the transition example of the embodiment. Therefore, a DMA transfer takes $\Delta t_{42}$ and can be made shorter than the DMA transfer time $\Delta t_{B2}$ of FIG. 6B.

Note that when it is determined that the user is not operating the mobile phone 1 at the operation determination step S4 of the clock level control process of FIG. 4 and at the operation determination step S12 of the clock level control process of FIG. 5, since the clock level controller 52 shifts the clock level according to the clock level determined based on the idle ratio of the CPU 46 even when the DMA transfer is being executed, the clock level is controlled likewise FIG. 6B.

According to the mobile phone 1, since the clock level is controlled based on the idle ratio of the CPU 46, an increase of the power consumption caused by operating the mobile phone 1 in an unnecessarily high clock level can be suppressed as well as since the clock level is increased to the highest level or to the predetermined level X when the DMA transfer is being executed, the processing performance of the DMA transfer can be kept high. Therefore, when a data copy process is executed from the memory card 57 to the storage unit 42 and the like of the mobile phone 1 through the DMA transfer by, for example, the operation of the user, since the clock level is increased to the highest level when the DMA transfer is being executed, a copy time is not prolonged and the operability to the user can be improved.

Further, the mobile phone 1 keeps the clock level determined based on the idle ratio of the CPU 46 even when the DMA transfer is being executed, and when the clock level is determined after the completion of the DMA transfer, the clock level is determined and controlled regarding that the present clock level is the clock level determined based on the idle ratio. Therefore, the clock level controller 52 does not operate the mobile phone 1 in an unnecessarily high the clock level even after the completion of the DMA transfer and the clock level can be transited to a clock level appropriate to an operating state of the CPU 46. As a result, the mobile phone 1 can suppress an unnecessary power consumption.

Further, when the DMA transfer is being executed, the clock level controller 52 does not increase the clock level to the highest level in all the cases but it determines whether or not the user is operating the mobile phone 1 and increases the clock level only when it determines that the user is operating the mobile phone 1. Therefore, when it is not necessary to increase the DMA transfer speed from the view point of the improvement of the operability to the user, since the clock level control is executed based on the idle ratio of the CPU 46, the power consumption can be preferably suppressed without unnecessarily operating the mobile phone 1 in the highest level. When, for example, the mobile phone 1 automatically downloads data from a contents server, since it can be said that the user is not operating the mobile phone 1, the operability to the user need not be improved. In this case, the mobile phone 1 can be continuously used for a long time by controlling the clock level according to the idle ratio of the CPU 46 giving priority to the suppression of the power consumption.

Further, since the clock level controller 52 keeps the clock level to the highest level or to the level X only for the predetermined time (for example, 10 msec) even after the completion of the DMA transfer, even when the DMA transfer is executed again just after the completion of the DMA transfer, the clock level controller 52 can be provided a high operability with respect to the user while suppressing a trouble of process without unnecessarily changing the clock level.

The present invention can be applied to a PDA (Personal Digital Assistant), a personal computer, a mobile game machine, a mobile music player, a mobile motion picture player, and other information processing apparatuses in addition to the mobile phone.

Further, although a series of the processes explained in the embodiment of the present invention can be executed by software, it can be also executed by hardware.

Furthermore, although the embodiment shows the example of the process in which the steps of the flowchart are executed time-sequentially along the sequence shown in the figures, the steps may not be necessarily executed time-sequentially, and the embodiment also includes a case in which the steps are executed individually or in parallel with each other.

What is claimed is:

1. An information processing apparatus comprising:
   a CPU;
   a clock supply unit configured to supply a clock signal;
   a CPU idle ratio obtaining unit configured to obtain the idle ratio of the CPU at each predetermined time;
   a clock control unit configured to determine an operating frequency of the clock signal; and
   a DMA transfer unit configured to execute a DMA transfer in synchronization with the clock signal supplied from the clock supply unit,
   wherein the clock control unit controls the operating frequency of the clock signal to the operating frequency determined based on the idle ratio of the CPU if the DMA transfer is not being executed, whereas the clock control unit controls the operating frequency of the clock signal to a predetermined frequency if the DMA transfer is being executed.

2. The information processing apparatus according to claim 1, wherein the clock control unit determines the operating frequency based on the idle ratio of the CPU obtained by the CPU idle ratio obtaining unit even if the DMA transfer is being executed and controls the operating frequency of the clock signal to the operating frequency determined based on the idle ratio of the CPU if the DMA transfer is finished.

3. The information processing apparatus according to claim 1, wherein the clock control unit only controls the operating frequency of the clock signal to the predetermined frequency if the information processing apparatus is operated by a user.

4. The information processing apparatus according to claim 3, further comprising a display unit,
   wherein the clock control unit determines that the information processing apparatus is operated by the user if the display unit is being lit.

5. The information processing apparatus according to claim 3 further comprising an input unit accepted an operation,
   wherein the clock control unit determines that the information processing apparatus is operated by the user if the DMA transfer is executed based on the operation accepted by the input unit.

6. The information processing apparatus according to claim 3 further comprising an body of openable/closable folding type,
   wherein the clock control unit determines that the information processing apparatus is operated by the user if the body is opened.

7. The information processing apparatus according to claim 1, wherein:
   the operating frequency shifts stepwise between a plurality of clock levels to which a predetermined operating frequency is allocated; and
   the clock control unit controls the clock level to the clock level to which a maximum operating frequency is allocated if the DMA transfer is being executed.

8. An information processing apparatus comprising:
   a CPU;
   a clock supply unit configured to supply a clock signal;
   a CPU idle ratio obtaining unit configured to obtain the idle ratio of the CPU at each predetermined time;
   a clock control unit configured to determine an operating frequency of the clock signal; and
   a DMA transfer unit configured to execute a DMA transfer in synchronization with the clock signal supplied from the clock supply unit,
   wherein the clock control unit controls the operating frequency of the clock signal to the operating frequency determined based on the idle ratio of the CPU if the DMA transfer is not being executed, whereas the clock control unit controls the operating frequency of the clock signal to a predetermined frequency or higher regardless of the idle ratio of the CPU if the DMA transfer is started.

9. The information processing apparatus according to claim 8, wherein the clock control unit only controls the operating frequency of the clock signal to the predetermined frequency if the information processing apparatus is operated by a user.

10. The information processing apparatus according to claim 8, wherein the clock control unit determines the operating frequency based on the idle ratio of the CPU obtained by the CPU idle ratio obtaining unit even if the DMA transfer is being executed and controls the operating frequency of the clock signal to the operating frequency determined based on the idle ratio of the CPU if the DMA transfer is finished.

11. The information processing apparatus according to claim 8, wherein the clock control unit controls the operating frequency of the clock signal to the predetermined frequency or higher until a predetermined time passes after the completion of the DMA transfer.

12. A method of controlling an operating frequency of an information processing apparatus, comprising the steps of:
   preparing the information processing apparatus configured to execute a DMA transfer in synchronization with a clock signal;
   obtaining the idle ratio of a CPU at each predetermined time;
   determining the operating frequency of the clock signal based on the idle ratio of the CPU;
   determining whether or not that the DMA transfer is being executed; and controlling the operating frequency of the clock signal to the operating frequency determined based on the idle ratio of the CPU if the DMA transfer is not being executed, whereas controlling the operating frequency of the clock signal to a predetermined frequency if the DMA transfer is being executed.

13. The method of controlling the operating frequency of the information processing apparatus according to claim 12, wherein:
the step of determining comprises determining the operating frequency based on the idle ratio of the CPU obtained even if the DMA transfer is being executed; and
the step of determining comprises controlling the operating frequency of the clock signal to the operating frequency determined based on the idle ratio of the CPU if the DMA transfer is finished.

14. The method of controlling the operating frequency of the information processing apparatus according to claim 12, further comprising the step of determining whether or not that the information processing apparatus is operated by a user,
wherein the step of controlling comprises only controlling the operating frequency of the clock signal to the predetermined frequency if the information processing apparatus is operated by a user.

15. The method of controlling the operating frequency of the information processing apparatus according to claim 14, further comprising the step of preparing the information processing apparatus provided with a display unit,
wherein the step of determining comprises determining that the information processing apparatus is operated by the user if the display unit is being lit.

16. The method of controlling the operating frequency of the information processing apparatus according to claim 14, further comprising the step of preparing the information processing apparatus provided with an input unit accepted an operation,
wherein the step of determining comprises determining that the information processing apparatus is operated by the user if the DMA transfer is executed based on the operation accepted by the input unit.

17. The method of controlling the operating frequency of the information processing apparatus according to claim 14, further comprising the step of preparing the information processing apparatus provided with an body of openable/closable folding type,
wherein the step of determining comprises determining that the information processing apparatus is operated by the user if the body is opened.

18. The method of controlling the operating frequency of the information processing apparatus according to claim 12, further comprising the step of controlling the operating frequency to the predetermined frequency or higher regardless of the idle ratio of the CPU if the DMA transfer is started.

19. The method of controlling the operating frequency of the information processing apparatus according to claim 12, further comprising the step of controlling the operating frequency to the predetermined frequency or higher until a predetermined time passes after the completion of the DMA transfer.

20. The method of controlling the operating frequency of the information processing apparatus according to claim 12, wherein:
the operating frequency shifts stepwise between a plurality of clock levels to which a predetermined operating frequency is allocated; and
the step of controlling comprises controlling the clock level to the clock level to which a maximum operating frequency is allocated if the DMA transfer is being executed.

* * * * *